(12) United States Patent
Nakamoto et al.

(10) Patent No.: US 6,930,823 B2
(45) Date of Patent: Aug. 16, 2005

(54) OPTICAL TRANSMISSION METHOD AND OPTICAL TRANSMISSION SYSTEM UTILIZING RAMAN AMPLIFICATION

(75) Inventors: Hiroshi Nakamoto, Kawasaki (JP); Takao Naito, Kawasaki (JP); Naomasa Shimojoh, Kawasaki (JP); Toshiki Tanaka, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/022,543

(22) Filed: Dec. 20, 2001

(65) Prior Publication Data

US 2003/0011874 A1 Jan. 16, 2003

(30) Foreign Application Priority Data

Jul. 16, 2001 (JP) .................................. 2001-215780

(51) Int. Cl.[7] .............................. H01S 3/00; H04B 10/08
(52) U.S. Cl. .......................................... 359/334; 398/30
(58) Field of Search ................................. 359/334, 134, 359/160, 341.3; 398/30; 372/3, 38.06, 70

(56) References Cited

U.S. PATENT DOCUMENTS

| 5,285,306 | A | * | 2/1994 | Heidemann | 359/160 |
| 5,436,750 | A | * | 7/1995 | Kawano | 359/177 |
| 5,546,213 | A | * | 8/1996 | Suyama | 359/179 |
| 6,344,922 | B1 | * | 2/2002 | Grubb et al. | 359/334 |
| 6,424,445 | B1 | * | 7/2002 | Tsushima et al. | 359/177 |
| 6,452,721 | B2 | * | 9/2002 | Deguchi et al. | 359/341.33 |

FOREIGN PATENT DOCUMENTS

JP 3-239028 * 10/1991

OTHER PUBLICATIONS

Emori et al, 5th Optoelectronics & Comm. Conference, pp 26–27. (OECC), Jul. 2000.*
Walker, K. L., OSA & OPS, Optical Amps and their applications. pp. 5–17, 1998.*
Emori etal, OFC '99, pp 19–1 to 19–3, 1999.*
Yoshihiro Emori, et al., " 100nm Bandwidth Flat Gain Raman Amplifiers Pumped and Gain–Equalized by 12–Wavelength–Channel WDM High Power Laser Diodes", OFC '99, PD19, 1999.*

* cited by examiner

Primary Examiner—Mark Hellner
Assistant Examiner—Deandra M. Hughes
(74) Attorney, Agent, or Firm—Staas & Halsey LLP

(57) ABSTRACT

The present invention has an object to provide an optical transmission technology using Raman amplification wherein a supervisory signal transferred among a plurality of optical transmission apparatuses is superimposed on a main signal light by using a pumping light for Raman amplification. To this end, a Raman amplifier applied with the optical transmission method of the present invention, is provided with a supervisory signal superimposing section for superimposing a supervisory signal transferred among the optical transmission apparatuses on at least one of a plurality of pumping lights of different wavelengths to be supplied to a Raman amplification medium via a multiplexer from a pumping light generating section, thereby transmitting the main signal light propagated through the Raman amplification medium to be Raman amplified, which is superimposed with the supervisory signal.

27 Claims, 4 Drawing Sheets

OPTICAL TRANSMISSION METHOD AND OPTICAL TRANSMISSION SYSTEM UTILIZING RAMAN AMPLIFICATION

BACKGROUND OF THE INVENTION (1) Field of the Invention

The present invention relates to an optical transmission method and an optical transmission system for performing repeating transmission of a wavelength division multiplexed (WDM) signal light while amplifying thereof, and, especially to a superimposition technology of a supervisory signal in a case of amplifying a WDM signal light using Raman amplification.

(2) Related Art

For a WDM optical transmission system for transmitting a WDM signal light including a plurality of optical signals of different wavelengths, there has been known a system structure adopted with an optical amplifying-and-repeating transmission system using an optical amplifier as an optical repeater. For the above-mentioned optical amplifier, an erbium doped optical fiber amplifier (EDFA) is generally used, and recently, the use of Raman amplifier together with the EDFA is being greatly reviewed.

A gain of the Raman amplifier has large wavelength dependency, but a gain wavelength characteristic of the Raman amplification can be flattened by the use of a plurality of pumping lights of different oscillation center wavelengths. For example, in the Raman amplifier described in the article, "100 nm bandwidth flat gain Raman amplifiers pumped and gain-equalized by 12-wavelength channel WDM high power laser diodes", Y. Emori, et al., OFC '99, PD19, 1999 and so forth, approximately 100 nm as a gain wavelength bandwidth of the Raman amplification is secured by adjusting a pumping light power and its oscillation wavelength.

For the WDM optical transmission system adopted with the optical amplifying-and-repeating transmission system, there is known a technology to supervise and control a plurality of optical transmission apparatuses such as an optical sending terminal, an optical repeater, an optical receiving terminal, and the like, by superimposing a supervisory signal on a main signal light to be transferred among each of optical transmission apparatus. For one conventional method for superimposing the supervisory signal on the main signal light in this case, there is known a method for modulating a driving current of a pumping light source of the EDFA in accordance with the supervisory signal. Specifically, a transmission speed of the supervisory signal is set to approximately 10 Mb/s and its superimposition degree is set to approximately 5% when a transmission speed of the main signal light is set as 10 Gb/s.

Considering a case where the above conventional monitor control technology is applied to the WDM optical transmission system constructed by using the optical repeater that uses the EDFA and the Raman amplifier together, which are being reviewed presently, the method for superimposing the supervisory signal on the main signal light is not limited to the method for modulating the pumping light of the EDFA in accordance with the supervisory signal, and a more efficient supervising and controlling technology is expected to be realized. Further, since it can be considered that, in the future, the optical repeater shall be constituted using only the Raman amplifier, it will be useful to realize the supervising and controlling technology capable of coping with the system using such optical repeaters.

SUMMARY OF THE INVENTION

The present invention has been achieved in view of the foregoing problems, and has an object of providing an optical transmission technology using Raman amplification that has realized an efficient supervising and controlling by superimposing a supervisory signal on a main signal light transferred among a plurality of optical transmission apparatuses by making use of a pumping light for Raman amplification.

In order to achieve the above object, an optical transmission method using Raman amplification according to the invention is a method for transmitting a WDM signal light among a plurality of optical transmission apparatuses and supplying a pumping light to a Raman amplification medium existing on an optical transmission path, to Raman amplify the WDM signal light being propagated through the Raman amplification medium, wherein a supervisory signal transferred among the plurality of optical transmission apparatuses is superimposed on the pumping light supplied to the Raman amplification medium. Moreover, for the abovementioned optical transmission method, when a plurality of pumping lights of different wavelengths are supplied to the Raman amplification medium, the supervisory signal may be superimposed on at least one of the plurality of pumping lights.

According to such an optical transmission method, it is no longer necessary to superimpose the supervisory signal on the entire wavelength band of the WDM signal light as with a case where the pumping light of the conventional EDFA is utilized. Therefore, it becomes possible to superimpose a more efficient supervisory signal in a wavelength band of good excitation efficiency.

Further, in the abovementioned optical transmission method, it is preferable that the pumping light to be superimposed with the supervisory signal is selected out of a plurality of pumping lights based on loss wavelength characteristics of the optical transmission path. Specifically, the pumping light to be superimposed with the supervisory signal can be selected out of the plurality of pumping lights so that a loss of the optical transmission path in a Raman gain band corresponding to a wavelength of the pumping light becomes smaller than the loss of the optical transmission path corresponding to a wavelength of the other pumping light.

Also, in the abovementioned optical transmission method, the construction may be such that a part of the Raman amplified WDM signal light input to the optical transmission apparatus through the optical transmission path is led to an optical filter having a passing band in the Raman gain band corresponding to the wavelength of the pumping light superimposed with the supervisory signal, to detect the supervisory signal using a light passing through the optical filter. According to this method, transmission of the supervisory signal among the respective optical transmission apparatuses can be performed more reliably.

Moreover, in the abovementioned optical transmission method, the construction may be such that the supervisory signal transmitted from a previous stage optical transmission apparatus is detected to superimpose a suppression signal to suppress the detected supervisory signal on the pumping light corresponding to the pumping light superimposed with the supervisory signal from the previous stage optical transmission apparatus, among the pumping lights of different wavelengths to be supplied to the Raman amplification medium. In addition, the supervisory signal to be sent to a succeeding stage optical transmission apparatus may be superimposed on the pumping light different from the pumping light superimposed with the suppression signal. By applying such a method, it becomes possible to switch a wavelength band where the supervisory signal is superimposed.

The optical transmission method as described above can be applied to an optical transmission system to transmit a WDM signal light using Raman amplification and a Raman amplifier.

The other objects, features and advantages of this invention will become apparent from the following description of embodiment with reference to accompanying drawings.

DETAILED DESCRIPTION OF THE INVENTION

An embodiment according to the present invention will be explained based on drawings as follows.

Figure 1:
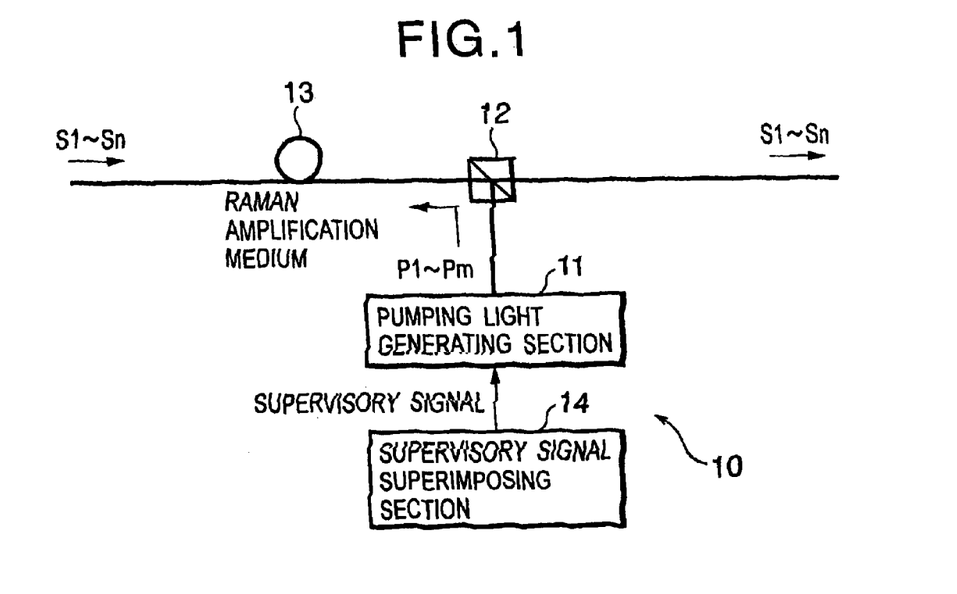
FIG. 1 is a diagram showing a basic configuration of a Raman amplifier to which an optical transmission method according to the invention is applied.

FIG. 1 is a diagram showing a basic configuration of a Raman amplifier to which an optical transmission method according to the invention is applied.

In FIG. 1, a Raman amplifier 10 comprises a pumping light generating section 11 that generates pumping lights P1~Pm having different wavelengths, a multiplexer 12 that supplies each of the pumping lights P1~Pm to a Raman amplification medium 13 existing on an optical transmission path, and a supervisory signal superimposing section 14 that superimposes a supervisory signal on at least one of the pumping lights P1~Pm to be supplied to the Raman amplification medium 13, and Raman amplifies a WDM signal light (including optical signals S1~Sn having different wavelengths) being propagated through the Raman amplification medium 13, to output.

Figure 2:
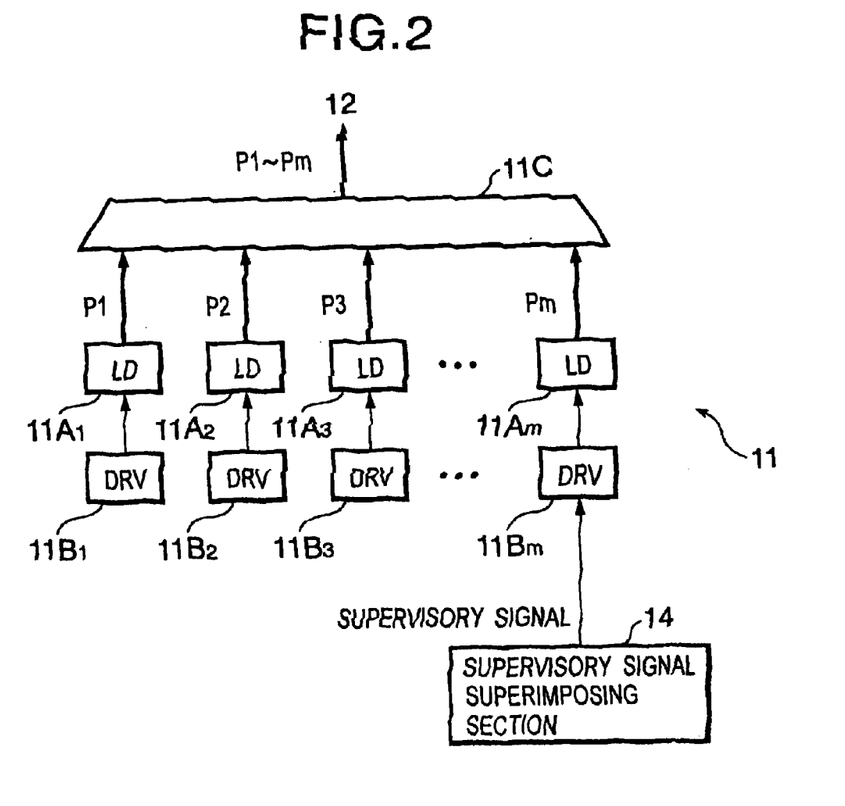
FIG. 2 is a diagram showing a specific construction example of a pumping light generating section in the Raman amplifier of FIG. 1.

A pumping light generating section 11, as shown in FIG. 2, includes pumping light sources (LD) $11A_1$~$11A_m$ and driving circuits (DRV) $11B_1$~$11B_m$ for generating the pumping lights P1~Pm having different wavelengths and a multiplexer 11C that multiplexes the pumping lights P1~Pm of the respective wavelengths to be output from the respective pumping light sources $11A_1$~$11A_m$, to output. Herein, a supervisory signal from the supervisory signal superimposing section 14 is supplied to the driving circuit $11B_m$ for driving the pumping light source $11A_m$ and a driving current generated in the driving circuit $11B_m$ is modulated in accordance with the supervisory signal, so that the supervisory signal is superimposed on the pumping light Pm generated in the pumping light source $11A_m$. The pumping light superimposed with the supervisory signal is not limited to the pumping light Pm, and the supervisory signal can be superimposed on a plurality of pumping lights, and a wavelength of the pumping light superimposed with the supervisory signal can be appropriately selected corresponding to a loss wavelength characteristic of an optical transmission path as described later.

Figure 3:
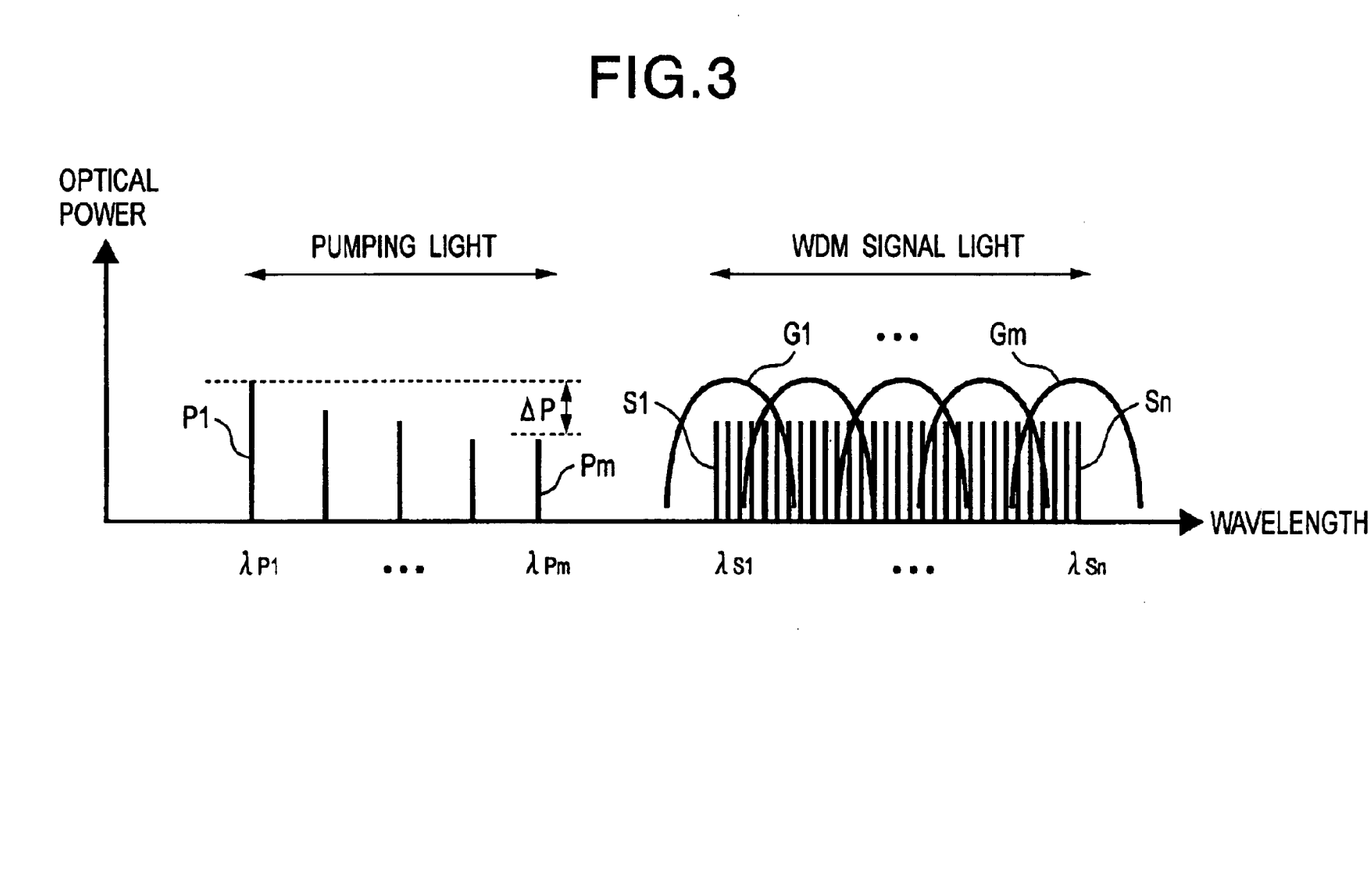
FIG. 3 is a diagram for explaining wavelength locations of a pumping light and a WDM signal light, and a Raman gain band corresponding to each of the pumping light, in the Raman amplifier of FIG. 1.

Wavelengths $\lambda_{P1}$~$\lambda_{Pm}$ of the respective pumping lights P1~Pm, for example as shown in a schematic diagram in FIG. 3, are previously set so that a substantially flat Raman gain can be obtained over wavelength bands $\lambda_{S1}$~$\lambda_{Sn}$ of the WDM signal light by combining the plurality of pumping lights P1~Pm based on a wavelength in which respective Raman gains G1~Gm become maximum being positioned at a frequency smaller by 13.2 THz than the wavelengths $\lambda_{P1}$~$\lambda_{Pm}$ of the pumping lights. Powers of pumping lights P1~Pm are respectively adjusted as shown in the left side of FIG. 3 taking into consideration the loss wavelength characteristic of the optical transmission path including the Raman amplification medium 13. A setting example of each pumping light power illustrated in FIG. 3 corresponds to a case where the wavelength bands $\lambda_{S1}$~$\lambda_{Sn}$ of the WDM signal light exhibit characteristics to increase as the loss of the optical transmission path is in the shorter wavelength side, in which the pumping light power on the shorter wavelength side is set to be increased by $\Delta P$ compared with the pumping light power on the longer wavelength side. Thereby, a more flattened Raman gain can be realized in regard to the wavelength bands $\lambda_{S1}$~$\lambda_{Sn}$ of the WDM signal light.

The pumping lights P1~Pm of respective wavelengths multiplexed by the multiplexer 11C of the pumping light generating section 11 are supplied to the Raman amplification medium 13 via the multiplexer 12 inserted on the optical transmission path and are propagated in a reverse direction to a transmission direction of the WDM signal light as shown in FIG. 1. The WDM signal light is propagated through the Raman amplification medium 13 to which the pumping lights P1~Pm are supplied, so that optical signals S1~Sn of respective wavelengths are Raman amplified with substantially equal gains. At this time, the supervisory signal superimposed on the pumping light Pm is superimposed only on the optical signal on the long wavelength side in the vicinity of the wavelength $\lambda_{Sn}$ to be superimposed mainly in accordance with the Raman gain Gm corresponding to the pumping light wavelength $\lambda_{Pm}$. Thus, the WDM signal light is transmitted among the optical transmission apparatuses constructing the optical transmission system, while being Raman amplified, thereby performing transmission of the supervisory signal simultaneously.

Figure 4:
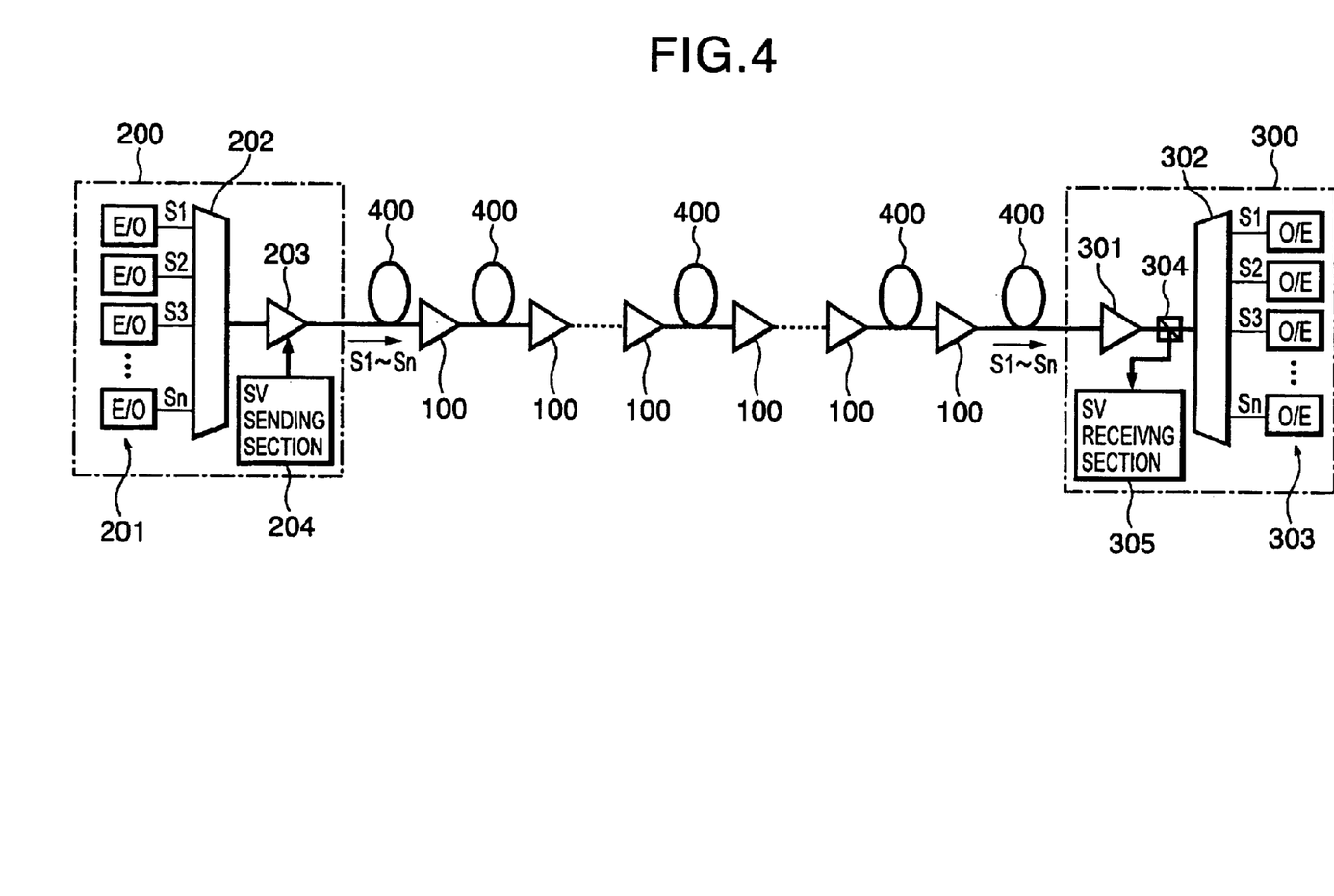
FIG. 4 is a schematic diagram showing one example of a WDM optical transmission system constructed by applying the Raman amplifier in FIG. 1 to an optical repeater.

FIG. 4 is a schematic diagram showing one example of a WDM optical transmission system constructed by applying the Raman amplifier 10 in FIG. 1 to an optical repeater or the like.

In the WDM optical transmission system in FIG. 4, a WDM signal light including optical signals S1, S2, . . . , Sn is transmitted via an optical transmission path 400 from an optical sending terminal 200 to an optical receiving terminal 300. On the optical transmission path 400, optical repeaters 100 equipped with the Raman amplifier 10 in FIG. 1 are positioned in required repeating intervals, and the WDM signal light to be transmitted on the optical transmission path 400 is repeatedly transmitted while being Raman amplified. Here, the optical sending terminal 200, each of the optical repeaters 100, and the optical receiving terminal 300 correspond to a plurality of optical transmission apparatuses constructing an optical transmission system.

The optical sending terminal 200 includes n pieces of optical senders (E/O) 201 for generating the optical signals S1, S2, . . . , Sn a multiplexer 202 for multiplexing the optical signals S1, S2, ~Sn output from the respective optical senders 201 to output, a post-amplifier 203 for amplifying the WDM signal light output from the multiplexer 202 to a required level, and a SV sending section 204 for superimposing a supervisory signal on a main signal light via the post-amplifier 203. For the above post-amplifier 203, the supervisory signal from the SV sending section 204 may be superimposed on a pumping light for Raman amplification by applying the Raman amplifier 10 shown in FIG. 1 as described above, or alternatively, the supervisory signal from the SV sending section 204 may be superimposed on a pumping light of the EDFA by applying the EDFA as with the conventional technique.

Figure 5:
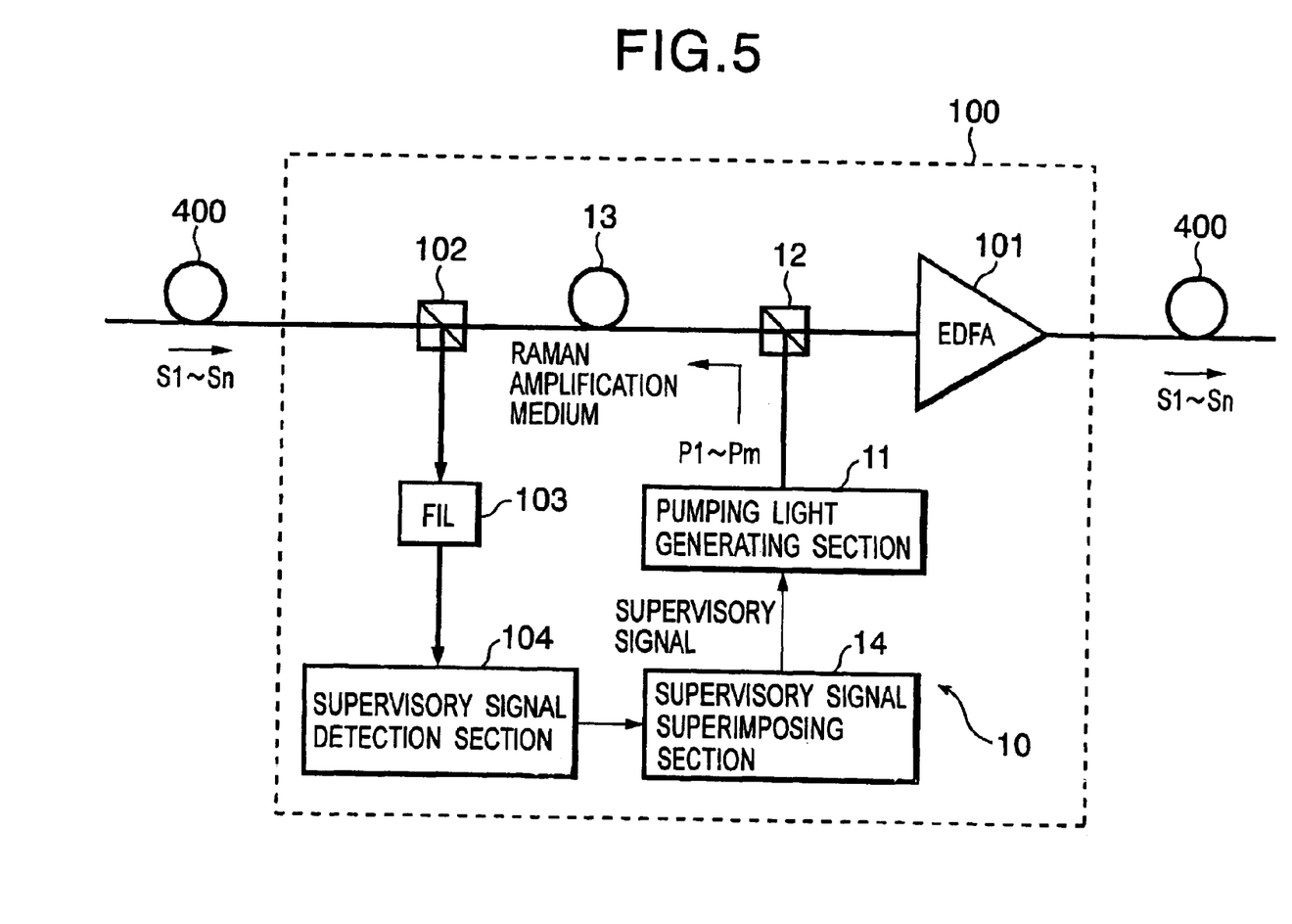
FIG. 5 is a diagram showing a specific construction example of an optical repeater to be used for the WDM optical transmission system in FIG. 4.

Each optical repeater 100, as shown in FIG. 5, amplifies the WDM signal light sent via the optical transmission path 400 to a required level by making use of a known EDFA 101 together with the Raman amplifier 10 having the basic configuration shown in FIG. 1 as described above. Specifically, the Raman amplifier 10 is arranged on a front stage of the EDFA 101 to further amplify the Raman amplified WDM signal light by the EDFA 101. Here, an optical coupler 102, an optical filter 103, and a supervisory signal detecting section 104 are disposed within each optical repeater 100 in order to detect the supervisory signal superimposed on the main signal light in the optical sending terminal 200 or the preceding stage optical repeater 100.

The optical coupler 102 is inserted, for example, between an input terminal of the optical repeater 100 and the Raman amplification medium 13, and branches a part of the WDM signal light input from the optical transmission path 400 to the optical repeater 100 to output it to the optical filter 103. The optical filter 103 extracts a wavelength light component equivalent to a Raman gain band corresponding to a wavelength of the pumping light superimposed with the supervisory signal (pumping light Pm in the setting examples in FIG. 2 and FIG. 3), to output it to the supervisory signal detecting section 104. The supervisory signal detecting section 104 converts an optical signal extracted at the optical filter 103 into an electrical signal with a light receiving element not shown herein, to detect a supervisory signal superimposed on the electrical signal. The supervisory signal detected at the supervisory signal detecting section 104 is utilized in a supervisory control for the optical repeater and also is transmitted to the supervisory signal superimposing section 14.

The construction using the EDFA 101 together with the Raman amplifier 10 has been described as the optical repeater 100. However, for the optical transmission apparatus using the optical transmission system according to the invention, it is also possible to amplify a signal light utilizing only the Raman amplifier 10.

The optical receiving terminal 300 includes a preamplifier 301 for receiving the WDM signal light sent from the optical transmission path 400 to amplify it to a required level, a demultiplexer 302 for demultiplexing the WDM signal light amplified at the preamplifier 301 to the optical signals S1~Sn of respective wavelengths to output it, n pieces of optical receivers (O/E) 303 for performing a receiving process of each optical signal S1~Sn output from the demultiplexer 302, an optical coupler 304 for branching a part of the WDM signal light sent to the demultiplexer 302 from the preamplifier 301, and a SV receiving section 305 for detecting a supervisory signal superimposed on the WDM signal light by using a branch light of the optical coupler 304. The preamplifier 301, the demultiplexer 302, and the each optical receiver 303 are the same as those used in the conventional optical receiving terminal. The optical coupler 304 corresponds to the optical coupler 102 disposed in the optical repeater 100, and the SV receiving section 305 includes a function corresponding to the optical filter 103 and the supervisory signal detecting section 104 disposed in the optical repeater 100.

In the WDM optical transmission system of the above-mentioned construction, optical signals S1~Sn of respective wavelengths generated at respective optical senders 201 of the optical sending terminal 200 are wavelength division multiplexed at the multiplexer 202, to be sent to the post-amplifier 203. In the post-amplifier, the WDM signal light from the multiplexer 202 is amplified, and the supervisory signal from the SV sender 204 is superimposed on the pumping light, thereby generating the WDM signal light including the supervisory signal, to be sent to the optical transmission path 400.

When the WDM signal light sent to the optical transmission path 400 reaches the optical repeater 100, it is sent to the Raman amplifier 10 and also a part thereof is branched at the optical coupler 102 to be sent to the optical filter 103. In the optical filter 103, a wavelength optical component superimposed with the supervisory signal at the optical sending terminal 200 is extracted. A light having passed through the optical filter 103 is sent to the supervisory signal detecting section 104 at which the detection process is performed for the supervisory signal from the optical sending terminal 200. Then, an operation of the optical repeater 100 is controlled based on the detection result of the supervisory signal detecting section 104.

The wavelength light including the supervisory signal is extracted by using the optical filter 103, so that the detection of the supervisory signal is performed with higher accuracy. Namely, the wavelength optical component superimposed with the supervisory signal is at a wavelength band of a part of the WDM signal light in the superimposition of the supervisory signal using the pumping light for Raman amplification. Therefore, when a branch light of the optical coupler 102 is used for the detection process of the supervisory signal without using the optical filter 103, the wavelength light on which the supervisory signal is not superimposed becomes a noise component, causing deterioration of SN ratio in supervisory signal detection. Accordingly, only the wavelength including the supervisory signal is extracted by using the optical filter 103, thereby enabling the detection of the supervisory signal by a monitoring light with a good SN ratio.

The WDM signal light sent to the Raman amplifier 10 after having passed through the optical coupler 102 is Raman amplified by being propagated through the Raman amplification medium 13 to which the pumping lights P1~Pm are supplied. At this time, the supervisory signal generated at the supervisory signal superimposing section 14 has been superimposed on the pumping light Pm among the pumping lights P1~Pm, and the above supervisory signal is superimposed on the WDM signal light of the wavelength band corresponding to the Raman gain band corresponding to this pumping light Pm. The supervisory signal generated at the supervisory signal superimposing section 14 is a signal suppressing a supervisory signal component from the optical sending terminal 200 detected at the supervisory signal detecting section 104, and indicating monitor information to be transmitted to the next optical repeater 100.

It is preferable that the wavelength band of the WDM signal light to be superimposed with the supervisory signal is in advance designed to be in the wavelength band where a loss of the optical transmission path including the Raman amplification medium 13 becomes relatively small. With this design, superimposition of the supervisory signal on the main signal light can be performed more efficiently. Namely, in order to superimpose the supervisory signal on the signal light of a wavelength band where the loss of the optical transmission path is relatively large, it 'is required to perform the superimposition of a relatively large amplitude on the pumping light corresponding to this wavelength band, resulting in a possibility that an operation of the pumping light source becomes strict to the maximum output standard. To avoid this problem, the supervisory signal is superimposed on the signal light of a wavelength band where the loss of the optical transmission path is relatively small, so that it becomes possible to make the power and amplitude of the pumping light small, thereby enabling to easily operate the pumping light source with respect to the maximum output standard. Explaining a specific example, if considering a case where the WDM signal light of 1.55 μm band (C band), the supervisory signal may be superimposed on the pumping light having a Raman gain band on the wavelength side with a relatively small loss of the optical transmission path by avoiding a short wavelength band in the vicinity of 1.4 μm where the loss of the optical fiber transmission path becomes large due to an influence of an OH group. It is necessary to pay an attention to the modulation efficiency reduction resulting from the amplification of the pumping light on the long wavelength side by the pumping light on the short wavelength side (pump to pump), when selecting the pumping light to be superimposed with the supervisory signal.

Here, the supervisory signal transmitted from the previous stage apparatus is suppressed, and the supervisory signal indicating the supervisory information to be sent to the succeeding stage apparatus is generated at the supervisory signal superimposing section 14, so that the supervisory signal is superimposed on the pumping light (Pm) of the same wavelength. However, the present invention is not limited thereto. It is possible to switch the pumping light to be superimposed with the supervisory signal between neighboring apparatuses. Specifically, the suppression signal suppressing (offsetting) the supervisory signal is superimposed on the pumping light superimposed with the supervisory signal at the preceding apparatus and the supervisory signal to be sent to the succeeding stage apparatus is superimposed on the pumping light different from the pumping light superimposed with the suppression signal.

The WDM signal light amplified as above at the amplifier 10 of the previous stage of the optical repeater 100 is sent and further amplified at the succeeding stage EDFA 101, and thereafter, output to the optical transmission path 400. Then, the WDM signal light amplified and repeatedly transmitted sequentially at each optical repeater 100 as with the above, reaches the optical receiving terminal 300, and thereafter, sent to the preamplifier 301 to be amplified to a required level. The WDM signal light amplified at the preamplifier 301 is sent to the demultiplexer 302 to be demultiplexed to respective optical signals S1~Sn, and also a part thereof is branched at the optical coupler 304 to be sent to the SV receiving section 305.

At the SV receiving section 305, the wavelength light component superimposed with the supervisory signal is extracted by using the optical filter from a branched light of the optical coupler 304, and the detection process is performed for the supervisory signal from the previous stage optical repeater 100 using the extracted wavelength light. An operation of the optical receiving terminal 300 is controlled by utilizing the detection result of the SV receiving section 305.

In this manner, according to the present WDM optical transmission system, the supervisory signal can be transferred among the optical transmission apparatuses by superimposing the supervisory signal on the pumping light for Raman amplification and it becomes unnecessary to superimpose the supervisory signal on the entire wavelength band of the WDM signal light, differently from the system using the pumping light of the conventional EDFA. As a result, it becomes possible to perform the good efficient superimposition of the supervisory signal at a wavelength band having good excitation efficiency. Moreover, the detection process is performed for the supervisory signal by extracting only the wavelength light including the supervisory signal by using the optical filter, thereby enabling transmission of the supervisory signal among the optical transmission apparatuses more reliably. Such a transmission technology of the supervisory signal can easily cope with a case where a system performing an optical amplification using only the Raman amplifier will be realized, and thus is useful.

In the embodiment as described above, for the Raman amplifier 10, there has been described the construction where the Raman amplification medium is supplied with a plurality of pumping lights having different wavelengths, but the present invention is not limited thereto. The present invention can be also applied to the construction where the Raman amplification medium is supplied with the pumping light having a single wavelength. In FIG. 5, there has been shown a so-called centralized Raman amplification type construction in which the Raman amplification medium 13 is positioned within the optical repeater 100, but a so-called distributed Raman amplification type construction is made possible in which the optical transmission path 400 connected to the optical repeater 100 is used as the Raman amplification medium.

What is claimed:

1. An optical transmission method, using Raman amplification to amplify a wavelength division multiplexed signal light including a plurality of optical signals of different wavelengths transmitted among a plurality of optical transmission apparatuses and supplying a pumping light to a Raman amplification medium existing on an optical transmission path so as to Raman amplify the wavelength division multiplexed signal light propogating through the Raman amplification medium, wherein a supervisory signal transferred among said plurality of optical transmission apparatuses is selectively superimposed on the pumping light supplied to said Raman amplification medium, and wherein when a plurality (m) of pumping lights of different wavelengths are supplied to said Raman amplification medium, and said supervisory signal is selectively superimposed on at least one of 1 through (m−1) of said plurality of pumping lights of different wavelengths.

2. The method of claim 1, wherein the at least one of the 1 through (m−1) pumping lights on which the supervisory signal is superimposed is selected out of said plurality of pumping lights based on a loss wavelength characteristic of said optical transmission path.

3. The method of claim 2, wherein the at least one of the 1 through (m−1) pumping lights on which the supervisory signal is superimposed is selected so that the signal loss of in a Raman gain band corresponding to a wavelength of the one of the pumping lights is less than the loss of the optical transmission path corresponding to a wavelength of each of the others of the 1 through (m−1) pumping lights.

4. The method of claim 1, wherein a part of the Raman amplified wavelength division multiplexed signal light is directed to an optical filter having a passing band in a Raman gain band corresponding to a wavelength of the at least one of the 1 through (m−1) pumping lights on which the supervisory signal is superimposed, to detect the supervisory signal using a light passing through the optical filter.

5. The method of claim 1, wherein the supervisory signal transmitted from a previous stage optical transmission apparatus is detected and a suppression signal to suppress the detected supervisory signal on a pumping light corresponding to the at least one of the 1 through (m−1) pumping lights on which the supervisory signal is superimposed from the previous stage optical transmission apparatus.

6. The method of claim 5, wherein the supervisory signal to be sent to a succeeding stage optical transmission apparatus is superimposed on the at least one of the 1 through (m−1) pumping lights different from the pumping lights on which the suppression signal is superimposed.

7. An optical transmission system using Raman amplification, comprising:
a plurality of optical transmission apparatuses to transmit a wavelength division multiplexed signal light including a plurality of optical signals of different wavelengths, and
a Raman amplifier to Raman amplify the wavelength division multiplexed signal light propogating through a Raman amplification medium existing on an optical transmission path by supplying a pumping light to said Raman amplification medium so as to Raman amplify the wavelength division multiplexed signal,
wherein said Raman amplifier includes a supervisory signal superimposing section to selectively superimpose a supervisory signal transferred among said plurality of optical transmission apparatuses on the pumping light supplied to said Raman amplification medium,
wherein said Raman amplifier has a plurality of pumping light sources which generate a plurality (m) of pumping lights of different wavelengths, and
wherein said supervisory signal superimposing section selectively superimposes said supervisory signal on at least one of 1 through (m−1) of said plurality of pumping lights of different wavelengths supplied to said Raman amplification medium from said respective pumping light sources.

8. The optical transmission system of claim 7, wherein the supervisory signal superimposing section selects the at least one of the 1 through (m−1) pumping lights on which the supervisory signal is superimposed based on a loss wavelength characteristic of the optical transmission path.

9. The optical transmission system of claim 7, wherein the supervisory signal superimposing section selects the at least one of the 1 through (m−1) pumping lights on which the supervisory signal is so that a loss of the optical transmission path in a Raman gain band corresponding to a wavelength of the pumping light becomes relatively small.

10. The optical transmission system of claim 7, wherein the optical sending terminal comprises an optical coupler which branches a part of the Raman amplified wavelength division multiplexed signal light sent from the optical transmission path, an optical filter which receives the branched light from the optical coupler and having a passing band in a Raman gain band corresponding to a wavelength of the at least one of the 1 through (m−1) pumping lights on which the supervisory signal is superimposed, and a supervisory signal detecting section which detects the supervisory signal using a light passing through the optical filter.

11. The optical transmission system of claim 7, wherein a plurality of Raman amplifiers are provided and each Raman amplifier includes a suppression signal superimposing section which superimposes a suppression signal to suppress the supervisory signal from a previous stage optical transmission apparatus detected at the corresponding optical transmission apparatus on the pumping light corresponding to the at least one of the 1 through (m−1) pumping lights on which the supervisory signal is superimposed.

12. An optical transmission system using Raman amplification according to claim 11, wherein the supervisory signal superimposing section of each Raman amplifier superimposes the supervisory signal to be sent to a succeeding stage optical transmission apparatus on the a pumping light different from the at least one of the 1 through (m−1) pumping lights on which the suppression signal is superimposed.

13. A Raman amplifier comprising:
a pumping light generating section to generate a pumping light; and
a multiplexer to supply the pumping light from said pumping light generating section to a Raman amplification medium so as to Raman amplify a wavelength division multiplexed light propagating through said Raman amplification medium,
wherein said Raman amplifier includes a supervisory signal superimposing section to selectively superimpose a supervisory signal transferred among said plurality of optical transmission apparatuses to transmit said wavelength division multiplexed light on the pumping light supplied to said Raman amplification medium from said pumping light generating section via said multiplexer,
wherein said Raman amplifier has a plurality of pumping light sources which generate a plurality (m) of pumping lights of different wavelengths, and
wherein said supervisory signal superimposing section selectively superimposes said supervisory signal on at least one of 1 through (m−1) of said plurality of pumping lights of different wavelengths supplied to said Raman amplification medium from said respective pumping light sources via said multiplexer.

14. A Raman amplifier according to claim 13, wherein the Raman amplifier includes a suppression signal superimposing section which superimposes a suppression signal to suppress the supervisory signal from a previous stage optical transmission apparatus on the pumping light corresponding to the at least one of the 1 through (m−1) pumping lights on which the supervisory signal is superimposed from the previous stage optical transmission apparatus.

15. A Raman amplifier according to claim 14, wherein the supervisory signal superimposing section superimposes the supervisory signal to be sent to a succeeding stage optical transmission apparatus on a pumping light different from the pumping light superimposed with the suppression signal.

16. A method of Raman amplifying a wavelength division multiplexed signal light, comprising:
providing a wavelength division multiplexed signal light including a plurality of optical signals of different wavelengths through a transmission path including a Raman amplification medium disposed thereon;
supplying a plurality (m) of pumping lights of different wavelengths to the Raman amplification medium to Raman amplify a wavelength division multiplexed signal light propagating through the Raman amplification medium; and
selectively superimposing a supervisory signal on at least one of 1 through (m−1) of said plurality of pumping lights.

17. The method of claim 16, wherein the at least one of the 1 through (m−1) pumping lights on which the supervisory signal is superimposed is selected out of said plurality of pumping lights based on a loss wavelength characteristic of said optical transmission path.

18. An optical transmission method, comprising:

transmitting a wavelength division multiplexed signal light having a plurality of optical signals of different wavelengths along an optical transmission path that includes a Raman amplification medium;

Raman amplifying the wavelength division multiplexed signal light propagating through the Raman amplification medium by supplying a plurality of pumping lights of different wavelengths to the Raman amplification medium and selectively superimposing a supervisory signal onto at least one of the plurality of pumping lights based on a loss wavelength characteristic of the optical transmission path.

19. The method of claim 18, wherein the one of the pumping lights has less loss in the Raman gain band than the other pump lights of the plurality of pump lights.

20. An optical transmission system comprising:

an optical sending terminal which transmits a wavelength division multiplexed signal light having a plurality of optical signals of different wavelengths; and a Raman amplifier which Raman amplifies the wavelength division multiplexed signal light propagating through a Raman amplification medium disposed along the optical transmission path using a plurality of pumping lights supplied to the Raman amplification medium, the Raman amplifier including a pumping light generating section generating the plurality of pumping lights of different wavelengths and a supervisory signal superimposing section which selectively superimposes a supervisory signal onto one of the plurality of pumping lights based on a loss wavelength characteristic of the optical transmission path.

21. The method of claim 20, wherein the one of the pumping lights has less loss in the Raman gain band than the other pump lights of the plurality of pump lights.

22. A Raman amplifier comprising:

a pumping light generating section which generates a plurality of pumping lights of different wavelengths;

a multiplexer which supplies the pumping lights to a Raman amplification medium so as to Raman amplify a wavelength division multiplexed light propagating therethrough; and a supervisory signal superimposing section which selectively superimposes a supervisory signal onto at least one of the plurality of pumping lights based on a loss wavelength characteristic of the optical transmission path.

23. The Raman amplifier of claim 22, wherein the one of the pumping lights has less loss in the Raman gain band than the other pump lights of the plurality of pump lights.

24. A method comprising:

transmitting a wavelength division multiplexed (WDM) signal light through an optical transmission line, the WDM optical signal including optical signals at different wavelengths multiplexed together;

supplying a plurality of pump lights at different wavelengths to the transmission line so as to Raman amplify the WDM signal light as the WDM signal light travels through a Raman amplification medium on the transmission line; and superimposing supervisory information onto at least one pump light of the plurality of pump lights so that, as the plurality of pump lights travel through the transmission line, the supervisory information becomes superimposed on a part of the WDM signal light in accordance with the wavelength of the pump light on which the supervisory information is superimposed.

25. The method of 24, wherein the pump light on which the supervisory information is superimposed is selected from the plurality of pump lights so that a loss of the transmission line in a Raman gain band corresponding to the wavelength of the pump light on which the supervisory information is superimposed is smaller than losses of the transmission line corresponding to wavelengths of the other pump lights.

26. An apparatus comprising:

means for transmitting a wavelength division multiplexed (WDM) signal light through an optical transmission line, the WDM optical signal including optical signals at different wavelengths multiplexed together;

means for supplying a plurality of pump lights at different wavelengths to the transmission line so as to Raman amplify the WDM signal light as the WDM signal light travels through a Raman amplification medium on the transmission line; and means for superimposing supervisory information onto at least one of the plurality of pump lights so that, as the plurality of pump lights travel through the transmission line, the supervisory information becomes superimposed on a part of the WDM signal light in accordance with the wavelengths of the pump light on which the supervisory information is superimposed.

27. The apparatus of claim 26, wherein the pump light on which the supervisory information is superimposed is selected from the plurality of pump lights so that a loss of the transmission line in a Raman gain band corresponding to the wavelength of the pump light on which the supervisory information is superimposed is smaller than tosses of the transmission line corresponding to wavelengths of the other pump lights.

* * * * *

UNITED STATES PATENT AND TRADEMARK OFFICE
CERTIFICATE OF CORRECTION

PATENT NO. : 6,930,823 B2  Page 1 of 1
APPLICATION NO. : 10/022543
DATED : August 16, 2005
INVENTOR(S) : Hiroshi Nakamoto et al.

It is certified that error appears in the above-identified patent and that said Letters Patent is hereby corrected as shown below:

On the cover page, item (56) References Cited, U.S. Patent Documents, column 1, line 3, after "359/179" insert --5,861,980 A * 01/1999 Ono 359/341--

On the cover page, item (56) References Cited, U.S. Patent Documents, column 2, line 1, below "JP 3-239028 *10/1991" insert --WO WO 01/65737 A1--

On the cover page, item (56), References Cited, Other Publications, column 2, line 9, after "1999." delete "*"

On the cover page, item (56) References Cited, Other Publications, column 2, line 9, below "Yoshihiro Emori,..... 1999.*" insert --Emory, Y. et al., "Broadband lossless DCF using Raman amplification pumped by multichannel WDM laser diodes," Electronics letters, IEE Stevenage, GB, 29 Oct 1998, Vol. 34, No. 22, pages 2145-2146.--

Column 8, line 43, change "propogating" to --propagating--

Column 9, line 25, change "propogating" to --propagating--

Column 9, line 52, after "is" insert --superimposed--

Column 12, line 18, after "method of" insert --claim--

Column 12, line 48, change "tosses" to --losses--

Signed and Sealed this

Twenty-ninth Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,930,823 B2  Page 1 of 1
APPLICATION NO. : 10/022543
DATED : August 16, 2005
INVENTOR(S) : Hiroshi Nakamoto et al.

It is certified that error appears in the above-identified patent and that said Letters Patent is hereby corrected as shown below:

On the cover page, item (56) References Cited, U.S. Patent Documents, column 1, line 3, after "359/179" insert --5,861,980 A * 01/1999 Ono 359/341--

On the cover page, item (56) References Cited, Foreign Patent Documents, column 2, line 1, below "JP 3-239028 *10/1991" insert --WO WO 01/65737 A1--

On the cover page, item (56), References Cited, Other Publications, column 2, line 9, after "1999." delete "*"

On the cover page, item (56) References Cited, Other Publications, column 2, line 9, below "Yoshihiro Emori,...... 1999.*" insert --Emory, Y. et al., "Broadband lossless DCF using Raman amplification pumped by multichannel WDM laser diodes," Electronics letters, IEE Stevenage, GB, 29 Oct 1998, Vol. 34, No. 22, pages 2145-2146.--

Column 8, line 43, change "propogating" to --propagating--

Column 9, line 25, change "propogating" to --propagating--

Column 9, line 52, after "is" insert --superimposed--

Column 12, line 18, after "method of" insert --claim--

Column 12, line 48, change "tosses" to --losses--

This certificate supersedes Certificate of Correction issued August 29, 2006.

Signed and Sealed this

Thirtieth Day of January, 2007

JON W. DUDAS
*Director of the United States Patent and Trademark Office*